United States Patent
Saito et al.

(10) Patent No.: US 12,112,899 B2
(45) Date of Patent: Oct. 8, 2024

(54) ELECTROLYTIC CAPACITOR

(71) Applicant: Panasonic Intellectual Property Management Co., Ltd., Osaka (JP)

(72) Inventors: Kazuyo Saito, Osaka (JP); Yuichiro Tsubaki, Kyoto (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/208,788

(22) Filed: Jun. 12, 2023

(65) Prior Publication Data
US 2023/0326684 A1   Oct. 12, 2023

Related U.S. Application Data

(63) Continuation of application No. 17/518,849, filed on Nov. 4, 2021, now Pat. No. 11,715,605, which is a (Continued)

(30) Foreign Application Priority Data

Sep. 29, 2017   (JP) .................................. 2017-191961

(51) Int. Cl.
*H01G 9/035* (2006.01)
*H01G 9/028* (2006.01)
(Continued)

(52) U.S. Cl.
CPC ............. *H01G 9/035* (2013.01); *H01G 9/028* (2013.01); *H01G 9/145* (2013.01); *H01G 9/151* (2013.01); *H01G 9/042* (2013.01)

(58) Field of Classification Search
None
See application file for complete search history.

(56) References Cited

U.S. PATENT DOCUMENTS

| | | |
|---|---|---|
| 11,195,664 B2 | 12/2021 | Saito et al. |
| 2008/0002334 A1 | 1/2008 | Kakuma et al. |

(Continued)

FOREIGN PATENT DOCUMENTS

| | | |
|---|---|---|
| CN | 101106021 A | 1/2008 |
| CN | 102763181 A | 10/2012 |

(Continued)

OTHER PUBLICATIONS

International Search Report of PCT application No. PCT/JP2018/036209 dated Dec. 18, 2018.

(Continued)

*Primary Examiner* — Eric W Thomas
(74) *Attorney, Agent, or Firm* — Rimon P.C.

(57) ABSTRACT

An electrolytic capacitor includes a capacitor element and electrolytic solution. The capacitor element includes an anode body with an oxide film, and a solid electrolyte contacting the oxide film. The electrolytic solution contains a solvent and a solute. The solvent contains at least one selected from the group consisting of a lactone compound, a glycol compound, and a sulfone compound. The solute includes a first acid component and a base component. The first acid component includes at least one of a benzenedicarboxylic acid and a derivative of the benzenedicarboxylic acid. The base component includes at least one of an amine and an amidine. A concentration of the solute in the electrolytic solution ranges from 15% by mass to 40% by mass, inclusive. A ratio (V/Vw) of a formation voltage V of the oxide film to a rated voltage Vw of the electrolytic capacitor is less than or equal to 1.7.

13 Claims, 1 Drawing Sheet

Related U.S. Application Data continuation of application No. 16/810,105, filed on Mar. 5, 2020, now Pat. No. 11,195,664, which is a continuation of application No. PCT/JP2018/036209, filed on Sep. 28, 2018.

(51) Int. Cl.
*H01G 9/145* (2006.01)
*H01G 9/15* (2006.01)
*H01G 9/042* (2006.01)

(56) References Cited

U.S. PATENT DOCUMENTS

| | | | |
|---|---|---|---|
| 2009/0086410 A1* | 4/2009 | Tsubaki | H01G 9/045 361/505 |
| 2012/0300368 A1 | 11/2012 | Matsuura et al. | |
| 2019/0292320 A1 | 9/2019 | Watanabe et al. | |
| 2020/0203081 A1 | 6/2020 | Saito et al. | |

FOREIGN PATENT DOCUMENTS

| | | | |
|---|---|---|---|
| JP | 07249543 A * | 9/1995 | |
| JP | 2007-080888 A | 3/2007 | |
| JP | 2008-010657 A | 1/2008 | |
| JP | 2017-069537 A | 4/2017 | |
| WO | WO-2007046259 A1 * | 4/2007 | ............ H01G 9/035 |
| WO | 2011/099261 A1 | 8/2011 | |

OTHER PUBLICATIONS

English Translation of Chinese Office Action dated May 8, 2021 for the related Chinese Patent Application No. 201880061703.1.
Non-Final Office Action issued in U.S. Appl. No. 16/810,105, dated Apr. 22, 2021.
Notice of Allowance issued in U.S. Appl. No. 16/810,105, dated Aug. 5, 2021.
Non-Final Office Action issued in U.S. Appl. No. 17/518,849, dated Dec. 29, 2022.
Notice of Allowance issued in U.S. Appl. No. 17/518,849, dated Mar. 13, 2022.

* cited by examiner

ELECTROLYTIC CAPACITOR

RELATED APPLICATIONS

This application is a Continuation of U.S. patent application Ser. No. 17/518,849, filed on Nov. 4, 2021, which is a Continuation of U.S. patent application Ser. No. 16/810,105, now U.S. Pat. No. 11,195,664, filed on Mar. 5, 2020, which is a Continuation of the PCT International Application No. PCT/JP2018/036209 filed on Sep. 28, 2018, which claims the benefit of foreign priority of Japanese patent application No. 2017-191961 filed on Sep. 29, 2017, the contents all of which are incorporated herein by reference.

BACKGROUND

1. Technical Field

The present disclosure relates to an electrolytic capacitor including a solid electrolyte and an electrolytic solution.

2. Description of the Related Art

As a small-sized, high capacitance, and low equivalent series resistance (ESR) capacitor, a promising candidate is a so-called hybrid electrolytic capacitor, which is a capacitor including a solid electrolyte and an electrolytic solution. For example, International Publication No. 2011/099261 discloses a hybrid electrolytic capacitor including an anode body on which an oxide film (anodization film) is formed.

SUMMARY

An electrolytic capacitor according to a first aspect of the present disclosure includes a capacitor element and an electrolytic solution. The capacitor element includes an anode body with an oxide film, and a solid electrolyte in contact with the oxide film. The electrolytic solution contains a solvent and a solute. The solvent contains at least one selected from a group consisting of a lactone compound, a glycol compound, and a sulfone compound. The solute includes a first acid component and a base component. The first acid component includes at least one of a benzenedicarboxylic acid and a derivative of the benzenedicarboxylic acid. The base component includes at least one of an amine and an amidine. A concentration of the solute in the electrolytic solution ranges from 15% by mass to 40% by mass, inclusive. A ratio (V/Vw) of a formation voltage V of the oxide film to a rated voltage Vw of the electrolytic capacitor is less than or equal to 1.7.

An electrolytic capacitor according to a second aspect of the present disclosure includes a capacitor element and an electrolytic solution. The capacitor element includes an anode body with an oxide film, and a solid electrolyte in contact with the oxide film. The electrolytic solution contains a solvent and a solute. The solvent contains at least one selected from a group consisting of a lactone compound, a glycol compound, and a sulfone compound. The solute contains a first acid component and a base component. The first acid component includes at least one of a composite compound of an organic acid and an inorganic acid, and a derivative of the composite compound. The base component includes at least one of an amine and an amidine. A concentration of the solute in the electrolytic solution ranges from 10% by mass to 40% by mass, inclusive. A ratio (V/Vw) of a formation voltage V of the oxide film to a rated voltage Vw of the electrolytic capacitor is less than or equal to 1.7.

According to the present disclosure, there can be provided a hybrid electrolytic capacitor capable of sufficiently retaining electrostatic capacity and equivalent series resistance (ESR).

DETAILED DESCRIPTION OF EMBODIMENT

Figure 1:
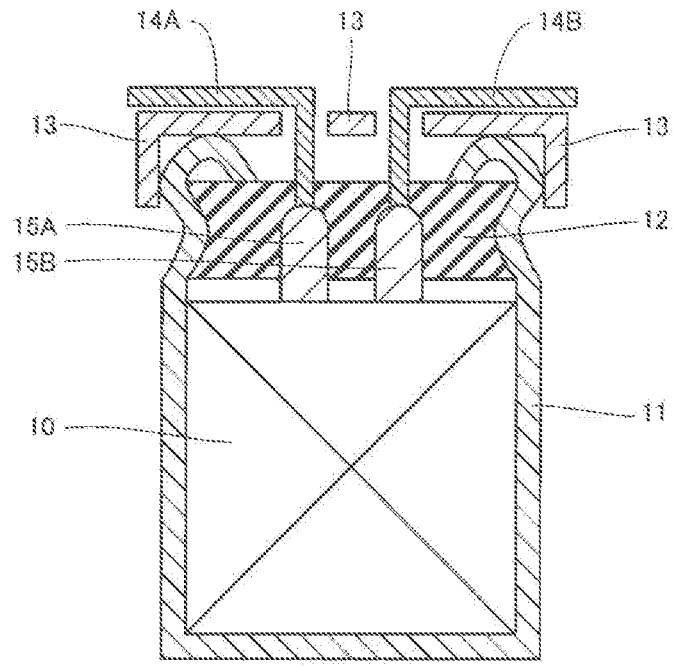
FIG. 1 is a schematic cross-sectional view illustrating an electrolytic capacitor according to one exemplary embodiment of the present disclosure.

Conventional hybrid electrolytic capacitors have not been capable of sufficiently retaining the electrostatic capacity and the equivalent series resistance (ESR) when the ratio of the formation voltage to the rated voltage is lowered.

First Exemplary Embodiment

An electrolytic capacitor according to the present exemplary embodiment includes a capacitor element and an electrolytic solution. The capacitor element includes an anode body including an oxide film, and a solid electrolyte in contact with the oxide film.

In a hybrid electrolytic capacitor, a solid electrolyte is in direct contact with an oxide film. Accordingly, in order to reduce a leak current, a formation voltage V of the oxide film is conventionally set at a value as high as about two times the rated voltage Vw of the electrolytic capacitor to form a sufficiently thick oxide film. Thus, it has been difficult, in the hybrid electrolytic capacitor, to reduce the ratio (V/Vw) of the formation voltage V to the rated voltage Vw for the purpose of an increase in the electrostatic capacity of the electrolytic capacitor or a reduction of the size of the electrolytic capacitor.

As a result of earnest studies made by the inventors of the present disclosure, it has been found that the electrolytic solution having a specific composition enables the hybrid electrolytic capacitor to retain the electrostatic capacity and the ESR even when the ratio (V/Vw) of the formation voltage V to the rated voltage Vw is reduced.

First point is using a specific solute and setting a concentration of the solute in a specific range. Specifically, a solute that includes a first acid component and a base component is used. As the first acid component, at least one of a benzenedicarboxylic acid and a derivative of the benzenedicarboxylic acid is used. As a base component, at least one of an amine and an amidine is used. A concentration of the solute contained in the electrolytic solution, i.e., a concentration of a total of an acid component, which includes the first acid component, and the base component is set at more than or equal to 15% by mass and less than 40% by mass.

Second point is using a specific solvent. Specifically, as the solvent, at least one selected from the group consisting of γ-butyrolactone, ethylene glycol, and sulfolane is used.

In the electrolytic solution having the above composition, the first acid component included in the solute is easily able to reach a vicinity of a defect of the anode body. Thus, self-repairing performance of the oxide film is improved, and the electrostatic capacity and the ESR of the electrolytic capacitor can be retained. Accordingly, the ratio (V/Vw) of the formation voltage V to the rated voltage Vw can be set at less than or equal to 1.7.

Meanwhile, when the electrolytic solution contains a polymer component, a concentration of the polymer component is set to range from 1% by mass to 15% by mass, inclusive. In this range of the concentration of the polymer component, even when the electrolytic solution contains the polymer component, movement of the first acid component in the electrolytic solution is less likely to be inhibited by the polymer component, so that the above effects can be obtained.

The oxide film is not limited to a film formed by a method (hereinafter, a first method) of applying a predetermined formation voltage to the anode body while immersing the anode body in an acidic aqueous solution (hereinafter, an anodizing solution). For example, the oxide film may be formed by heat-treating the anode body while immersing the anode body in an anodizing solution (hereinafter, a second method). When the oxide film is formed by the first method, the oxide film that has a thickness T corresponding to the formation voltage is formed. That is, the formation voltage is specified by the thickness T of the oxide film. When the oxide film is formed by the second method, the formation voltage necessary for forming the oxide film by the first method is specified by the thickness T of the oxide film. That is, the formation voltage V is defined as a voltage applied to the anode body to form the oxide film having the thickness T, as well as a voltage necessary for forming the oxide film having the thickness T.

The rated voltage Vw is an upper limit voltage set as rating, and a maximum value of voltage applied between electrodes of the electrolytic capacitor.

<Electrolytic Solution>

The electrolytic solution contains a solvent and a solute.

The electrolytic solution preferably has a pH of less than or equal to 4.5. The electrolytic solution having a pH of less than or equal to 4.5 easily suppresses a dedoping phenomenon of the solid electrolyte. The suppression of the dedoping phenomenon enables the electrolytic capacitor to retain the ESR. The electrolytic solution has a pH of further preferably less than or equal to 4, particularly preferably less than or equal to 3.8. The electrolytic solution preferably has a pH of more than or equal to 2.

The electrolytic solution preferably has a conductivity ranging from 0.01 mS/cm to 3 mS/cm, inclusive. The electrolytic solution having a conductivity in the above range further easily improves the self-repairing performance of the oxide film when the ratio (V/Vw) of the formation voltage V to the rated voltage Vw is set at less than or equal to 1.7.

(Solvent)

The solvent preferably contains at least one (hereinafter, a main solvent) selected from the group consisting of γ-butyrolactone (γBL), ethylene glycol (EG), and sulfolane (SL). As the main solvent, there may be used a glycol compound other than EG, a sulfone compound other than SL, and a lactone compound other than γBL. As the glycol compound other than EG, there can be used, for example, diethylene glycol, triethylene glycol, and propylene glycol. As the sulfone compound other than SL, there can be used, for example, dimethyl sulfoxide and diethyl sulfoxide. As the lactone compound other than γBL, there can be used, for example, γ-valerolactone. A proportion of the main solvent (for example, a total of γBL, EG, and SL) in the solvent is preferably more than or equal to 50% by mass, further preferably more than or equal to 60% by mass, further preferably more than or equal to 70% by mass.

The solvent can contain, as a solvent (hereinafter, an auxiliary solvent) other than the main solvent, a carbonate compound, a monohydric or trihydric or higher alcohol, or the like. As the carbonate compound, there can be used, for example, dimethyl carbonate (DMC), diethyl carbonate (DEC), ethyl methyl carbonate (EMC), ethylene carbonate (EC), propylene carbonate (PC), and fluoroethylene carbonate (FEC). As the alcohol, there can be used, for example, glycerin and polyglycerin. These compounds may be used alone or in combination of a plurality of compounds.

(Solute)

The concentration of the solute ranges from 15% by mass to 40% by mass, inclusive. The concentration of the solute ranges further preferably from 20% by mass to 40% by mass, inclusive, particularly preferably from 20% by mass to 35% by mass, inclusive.

A concentration of the solute is a total of a concentration of an acid component and a concentration of a base component. The acid component includes a first acid component and a second acid component other than the first acid component. The base component includes an amine and/or an amidine (hereinafter, a first base component) and a second base component other than the first base component.

The solute includes, as the first acid component, at least one of a benzenedicarboxylic acid and a derivative of the benzenedicarboxylic acid. The benzenedicarboxylic acid may be o-phthalic acid, m-phthalic acid, or p-phthalic acid. Examples of the derivative of the benzenedicarboxylic acid include 3-sulfophthalic acid, 3,5-disulfophthalic acid, 4-sulfoisophthalic acid, 2-sulfoterephthalic acid, and 2-methyl-5-sulfoterephthalic acid each having a sulfo group. Especially, o-phthalic acid is preferable.

A concentration of the first acid component in the electrolytic solution is preferably more than or equal to 5% by mass, further preferably more than or equal to 15% by mass, in consideration of easy disassociation of the first acid component. The concentration of the first acid component is preferably less than or equal to 35% by mass, further preferably less than or equal to 30% by mass.

The acid component may include a second acid component other than the first acid component.

Examples of an organic acid used as the second acid component include a polycarboxylic acid, a monocarboxylic acid, and a polyphenol.

Examples of the polycarboxylic acid include aliphatic polycarboxylic acids: ([saturated polycarboxylic acids such as oxalic acid, malonic acid, succinic acid, glutaric acid, adipic acid, pimelic acid, suberic acid, azelaic acid, sebacic acid, 1,6-decanedicarboxylic acid, and 5,6-decanedicarboxylic acid] and [unsaturated polycarboxylic acids such as maleic acid, fumaric acid, and itaconic acid]), aromatic polycarboxylic acids: (such as trimellitic acid and pyromellitic acid), and alicyclic polycarboxylic acids: (such as cyclohexane-1,2-dicarboxylic acid and cyclohexene-1,2-dicarboxylic acid).

Examples of the monocarboxylic acid include aliphatic monocarboxylic acids (1 to 30 carbon atoms): ([saturated monocarboxylic acids such as formic acid, acetic acid, propionic acid, butyric acid, isobutyric acid, valeric acid, caproic acid, enanthic acid, caprylic acid, pelargonic acid, lauric acid, myristic acid, stearic acid, and behenic acid] and [unsaturated monocarboxylic acids such as acrylic acid, methacrylic acid, and oleic acid]), aromatic monocarboxylic acids: (such as benzoic acid, cinnamic acid, and naphthoic acid), and oxycarboxylic acids: (such as salicylic acid, mandelic acid, and resorcinol acid). Among these polycarboxylic acids and monocarboxylic acids, maleic acid, benzoic acid, pyromellitic acid, and resorcinol acid are preferable that have high conductivity and are thermally stable.

Examples of the polyphenol include catechol, resorcinol, hydroquinone, pyrogallol, and phloroglucin.

Examples of an inorganic acid used as the second acid component include a carbon compound, a hydrogen compound, a boron compound, a sulfur compound, a nitrogen compound, and a phosphorus compound. Typical examples of the inorganic acid include phosphoric acid, phosphorous acid, hypophosphorous acid, alkyl phosphoric acid ester, boric acid, fluoroboric acid, tetrafluoroboric acid, hexafluorophosphoric acid, benzenesulfonic acid, and naphthalenesulfonic acid.

As the second acid component, there may be used a composite compound of an organic acid and an inorganic acid. Examples of the composite compound include borodiglycolic acid, borodioxalic acid, and borodisalicylic acid.

Especially, the second acid component is preferably at least one selected from the group consisting of an aromatic polycarboxylic acid, a polyphenol, and an oxycarboxylic acid, in consideration of further improving the self-repairing performance of the oxide film.

A concentration of the second acid component is preferably more than or equal to 3% by mass, further preferably more than or equal to 5% by mass. The concentration of the second acid component is preferably less than or equal to 25% by mass, further preferably less than or equal to 15% by mass.

The solute contains, as the first base component, at least one of an amine or an amidine.

The amine may be a primary amine, a secondary amine, or a tertiary amine. Each of the amines may be an aliphatic amine, an aromatic amine, or a heterocyclic amine. Especially, a tertiary amine is preferable in consideration of enhancing an effect of stabilizing the ESR for a long period.

Examples of the tertiary amine include trialkylamines (such as trimethylamine, dimethylethylamine, methyldiethylamine, triethylamine, dimethyl-n-propylamine, dimethylisopropylamine, methylethyl-n-propylamine, methylethylisopropylamine, diethyl-n-propylamine, diethylisopropylamine, tri-n-propylamine, triisopropylamine, tri-n-butylamine, and tri-t-butylamine) and phenyl group-containing amines (such as dimethylphenylamine, methylethylphenylamine, and diethylphenylamine). Especially, trialkylamines such as trimethylamine, dimethylethylamine, methyldiethylamine, and triethylamine are preferable in consideration of high conductivity.

The amidine is preferably a compound having an alkyl-substituted amidine group, in consideration of high conductivity. Examples of the compound having an alkyl-substituted amidine group include an imidazole compound, a benzimidazole compound, and an alicyclic amidine compound (a pyrimidine compound and an imidazoline compound). Specific examples of the compound having an alkyl-substituted amidine group include 1,8-diazabicyclo[5,4,0]undecene-7, 1,5-diazabicyclo[4,3,0]nonene-5,1,2-dimethylimidazolinium, 1,2,4-trimethylimidazoline, 1-methyl-2-ethylimidazoline, 1,4-dimethyl-2-ethylimidazoline, 1-methyl-2-heptylimidazoline, 1-methyl-2-(3'heptyl)imidazoline, 1-methyl-2-dodecylimidazoline, 1,2-dimethyl-1,4,5,6-tetrahydropyrimidine, 1-methylimidazole, 1-methylbenzimidazole, 1-methyl-1,8-diazabicyclo[5,4,0]undecene-7,1-methyl-1,5-diazabicyclo[4,3,0]nonene-5,1,2,3-trimethylimidazolinium, 1,2,3,4-tetramethylimidazolinium, 1,2-dimethyl-3-ethyl-imidazolinium, 1,3,4-trimethyl-2-ethylimidazolinium, 1,3-dimethyl-2-heptylimidazolinium, 1,3-dimethyl-2-(3'heptyl)imidazolinium, 1,3-dimethyl-2-dodecylimidazolinium, 1,2,3-trimethyl-1,4,5,6-tetrahydropyrimidium, 1,3-dimethylimidazolium, 1-methyl-3-ethylimidazolium, and 1,3-dimethylbenzimidazolium.

A concentration of the first base component in the electrolytic solution is preferably more than or equal to 3.5% by mass, further preferably more than or equal to 5% by mass. The concentration of the first base component is preferably less than or equal to 20% by mass, further preferably less than or equal to 10% by mass.

When the electrolytic solution includes an amine, a concentration of the amine in the electrolytic solution is preferably more than or equal to 3.5% by mass, further preferably more than or equal to 5% by mass. The concentration of the amine is preferably less than or equal to 20% by mass, further preferably less than or equal to 10% by mass.

When the electrolytic solution includes an amidine, a concentration of the amidine in the electrolytic solution is preferably more than or equal to 3.5% by mass, further preferably more than or equal to 5% by mass. The concentration of the amidine is preferably less than or equal to 20% by mass, further preferably less than or equal to 10% by mass.

The base component may include a second base component other than the first base component.

Examples of the second base component include ammonia and a quaternary ammonium compound. A concentration of the second base component in the electrolytic solution is preferably more than or equal to 0.1% by mass, further preferably more than or equal to 3% by mass. The concentration of the second base component is preferably less than or equal to 20% by mass, further preferably less than or equal to 10% by mass.

From a viewpoint of effectively suppressing dedoping of a dopant contained in a conductive polymer, the acid component is preferably more excessive than the base component in terms of an equivalence ratio. For example, the equivalence ratio of the acid component to the base component preferably ranges from 1 to 30, inclusive.

(Polymer Component)

The electrolytic solution may contain a polymer component. The polymer component is contained to suppress evaporation of the electrolytic solution and to improve withstand voltage of the electrolytic capacitor.

The polymer component is not particularly limited. Examples of the polymer component include a polyalkylene glycol, a derivative of the polyalkylene glycol, and a compound obtained by substituting at least one hydroxy group of a polyol with a polyalkylene glycol (including a derivative). Specific examples of the polymer component include polyethylene glycol, polyethylene glycol glyceryl ether, polyethylene glycol diglyceryl ether, polyethylene glycol sorbitol ether, polypropylene glycol, polypropylene glycol glyceryl ether, polypropylene glycol diglyceryl ether, polypropylene glycol sorbitol ether, and polybutylene glycol. These polymer components may be used alone or in mixture of two or more polymer components.

The polyalkylene glycol may be a copolymer (a random copolymer, a block copolymer, a random block copolymer, or the like). Examples of the copolymer include a copolymer of ethylene glycol and propylene glycol, a copolymer of an ethylene glycol and butylene glycol, and a copolymer of propylene glycol and butylene glycol.

The polymer component preferably has a weight-average molecular weight of more than or equal to 200. From a viewpoint of solubility in the solvent, the polymer component has a weight-average molecular weight of preferably less than or equal to 20,000, further preferably less than or equal to 5000.

A concentration of the polymer component in the electrolytic solution preferably ranges from 1% by mass to 15% by mass, inclusive. When the electrolytic solution has a concentration of the polymer component in the above range, evaporation of the electrolytic solution is suppressed, as well as movement of the first acid component in the electrolytic solution is not inhibited. Accordingly, the self-repairing performance of the oxide film is improved. The concentration of the polymer component in the electrolytic solution further preferably ranges from 1% by mass to 10% by mass, inclusive.

(Solid Electrolyte)

The solid electrolyte contains, for example, a manganese compound and a conductive polymer. As the conductive polymer, there can be used, for example, polypyrrole, polythiophene, polyaniline, and derivatives of these polymers. The solid electrolyte contains a dopant. More specifically, the solid electrolyte includes poly (3,4-ethylenedioxythiophene) (PEDOT) as the conductive polymer and polystyrenesulfonic acid (PSS) as the dopant.

The solid electrolyte may be formed by a method for applying, to the oxide film, a solution containing a monomer and the dopant, to cause chemical polymerization or electrolytic polymerization on the oxide film. The solid electrolyte, however, is preferably formed by a method for applying the conductive polymer to the oxide film, in consideration of excellent withstand voltage characteristics of the electrolytic capacitor expected by this method. That is, the solid electrolyte is preferably one formed by impregnating the oxide film with a polymer dispersion including a liquid component, the conductive polymer, and the dopant, and then volatilizing the liquid component. Here, the conductive polymer and the dopant are dispersed in the liquid component.

A concentration of the conductive polymer in the polymer dispersion preferably ranges from 0.5% by mass to 10% by mass, inclusive. The conductive polymer preferably has an average particle diameter D50 ranging, for example, from 0.01 μm to 0.5 μm inclusive. Here, the average particle diameter D50 is a median diameter in a volume particle size distribution obtained by a particle size distribution measuring apparatus according to dynamic light scattering.

(Formation Voltage V and Rated Voltage Vw)

The ratio (V/Vw) of the formation voltage V to the rated voltage Vw of the electrolytic capacitor is less than or equal to 1.7. Here, the formation voltage V is a voltage applied to the anode body for forming the oxide film having the thickness T. The ratio V/Vw may be less than or equal to 1.6. From a viewpoint of suppressing an increase of the leak current, the ratio V/Vw is preferably more than or equal to 1.4, further preferably more than or equal to 1.5.

The formation voltage V is not particularly limited, and may be appropriately set to give a ratio V/Vw of less than or equal to 1.7 according to the rated voltage Vw. The thickness T of the oxide film increases in proportion to the formation voltage V. For example, a formation voltage V of 17 volts forms the oxide film having a thickness T of 24 nm. A formation voltage V of 170 volts forms the oxide film having a thickness T of 238 nm. In other words, the formation voltage V applied or necessary to be applied to the anode body is specified to be 170 volts by the oxide film having a thickness T of 238 nm.

The rated voltage Vw is not also particularly limited, but the effects of the present disclosure are particularly exhibited when the rated voltage Vw is less than or equal to 100 V (that is, when the oxide film has a thickness T of less than or equal to 238 nm). Particularly, when the rated voltage Vw is less than or equal to 70 volts that forms a thinner oxide film, the effects of the present disclosure are further exhibited.

Hereinafter, the present disclosure is more specifically described with reference to the exemplary embodiment. The exemplary embodiment described below, however, is not to limit the present disclosure.

Figure 2:
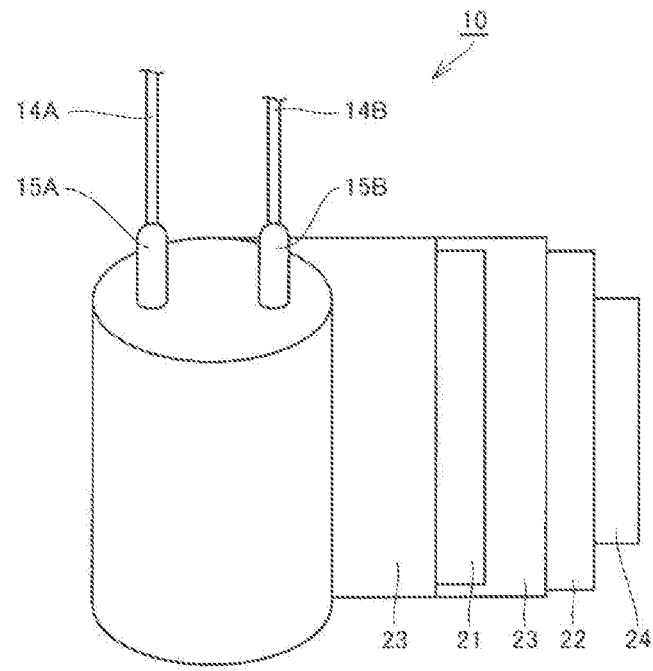
FIG. 2 is a schematic view for illustrating a configuration of a capacitor element according to the exemplary embodiment.

FIG. 1 is a schematic cross-sectional view illustrating an electrolytic capacitor according to the present exemplary embodiment, and FIG. 2 is a schematic view in which a capacitor element of the electrolytic capacitor is partially developed.

The electrolytic capacitor includes, for example, capacitor element 10, bottomed case 11 housing capacitor element 10, sealing member 12 sealing an opening of bottomed case 11 seat plate 13 that covers sealing member 12. The electrolytic capacitor further includes lead wires 14A, 14B that are drawn out from sealing member 12 and penetrate through seat plate 13, lead tabs 15A, 15B connecting the lead wires to electrodes of capacitor element 10, and an electrolytic solution (not shown). Bottomed case 11 is, at a part near an opening end, drawn inward, and is, at the opening end, curled to swage sealing member 12.

Capacitor element 10 is produced from a wound body illustrated in FIG. 2. The wound body includes anode body 21 connected to lead tab 15A, cathode body 22 connected to lead tab 15B, and separator 23. The wound body is a half-finished product where no solid electrolyte is formed between anode body 21 and cathode body 22.

Anode body 21 and cathode body 22 are wound with separator 23 interposed between the anode body and the cathode body. An outermost periphery of the wound body is fixed with fastening tape 24. FIG. 2 illustrates the wound body that is in a state before the outermost periphery of the wound body is fixed and that is partially developed.

Anode body 21 includes a metal foil whose surface is roughened to have projections and recesses, and an oxide film is formed on the metal foil having the projections and recesses. A solid electrolyte is attached to at least a part of a surface of the oxide film. The solid electrolyte may also cover at least a part of a surface of cathode body 22 and/or a part of a surface of separator 23. Capacitor element 10 in which the solid electrolyte has been formed is housed in bottomed case 11 together with the electrolytic solution.

Method for Manufacturing Electrolytic Capacitor

Hereinafter, described are steps of one exemplary method for manufacturing the electrolytic capacitor according to the present exemplary embodiment.

(i) Step of Preparing Anode Body 21 Including Oxide Film

First, a metal foil as a raw material for anode body 21 is prepared. A type of the metal is not particularly limited, but it is preferred to use a valve metal such as aluminum, tantalum, or niobium, or an alloy including a valve metal, in consideration of facilitating formation of the oxide film.

Next, a surface of the metal foil is roughened. By the roughening, a plurality of projections and recesses are formed on the surface of the metal foil. The roughening is preferably performed by subjecting the metal foil to an etching treatment. The etching treatment may be performed by, for example, a direct current (DC) electrolytic method or an alternating current (AC) electrolytic method.

Next, an oxide film having a thickness T is formed on the roughened surface of the metal foil. A method for forming the oxide film is not particularly limited, and the oxide film can be formed by subjecting the metal foil to an anodizing treatment. The anodizing treatment is performed by, for example, immersing the metal foil in an anodizing solution such as an ammonium adipate solution, followed by a heat treatment. The anodizing treatment may also be performed by applying a voltage to the metal foil that has been immersed in the anodizing solution.

Normally, a large foil of, for example, a valve metal (metal foil) is subjected to the roughening treatment and the anodizing treatment from a viewpoint of mass productivity. In this case, the treated foil is cut in a desired size to prepare anode body 21.

(ii) Step of Preparing Cathode Body 22

A metal foil can be used for cathode body 22 as with anode body 21. A type of the metal is not particularly limited, but it is preferred to use a valve metal such as aluminum, tantalum, or niobium, or an alloy including a valve metal. A surface of cathode body 22 may be roughened as necessary.

In addition, a layer containing titanium or carbon may be formed on the surface of cathode body 22.

(iii) Production of Wound Body

Next, anode body 21, cathode body 22, and separator 23 are used to produce a wound body illustrated in FIG. 2. An end of cathode body 22 positioned at an outermost layer is fixed with fastening tape 24. When anode body 21 is prepared by cutting a large metal foil, the wound body may further be subjected to an anodizing treatment in order to provide the oxide film on a cutting surface of anode body 21. As separator 23, a nonwoven fabric can be used that contains, as a main component, for example, a cellulose, polyethylene terephthalate, vinylon, or aramid fiber.

(iv) Step of Forming Capacitor Element 10

Next, a solid electrolyte is attached to a surface of the oxide film included in the wound body, to produce capacitor element 10. When the solid electrolyte includes a conductive polymer, a polymerization liquid may be used to cause chemical polymerization or electrolytic polymerization on the oxide film and thus to attach a synthesized conductive polymer to the oxide film. The polymerization liquid is a solution containing a monomer or an oligomer, a dopant, and the like. In the case of chemical polymerization, an oxidant is added to the polymerization liquid. Alternatively, a conductive polymer synthesized in advance may be attached to the oxide film. Pyrrole, aniline, thiophene, or a derivative of pyrrole, aniline, or thiophene is used for the monomer or the oligomer.

It is preferred to use a polymer dispersion as the conductive polymer synthesized in advance. The polymer dispersion contains a liquid component, a conductive polymer, and a dopant. The conductive polymer and the dopant are dispersed in the liquid component. A method for applying the polymer dispersion to the surface of the oxide film is preferably, for example, a method for impregnating the wound body with the polymer dispersion and drying the wound body, because the method is simple. The polymer dispersion preferably contains PEDOT as the conductive polymer and PSS as the dopant.

The step of applying the polymer dispersion to the surface of the oxide film and the step of drying the wound body may be repeated two or more times. These steps can be performed a plurality of times to increase coverage of the solid electrolyte on the oxide film.

(v) Step of Impregnating Capacitor Element 10 with Electrolytic Solution

Next, capacitor element 10 is impregnated with an electrolytic solution. A method for impregnating capacitor element 10 with the electrolytic solution is not particularly limited.

(vi) Step of Sealing Capacitor Element in Bottomed Case

Next, capacitor element 10 is housed in bottomed case 11. As a material for bottomed case 11, there can be used metals such as aluminum, stainless steel, copper, iron and brass, and alloys of these metals. Thereafter, bottomed case 11 is, at a part near an opening end, laterally drawn, and is, at the opening end, curled to swage sealing member 12. Then, seat plate 13 is disposed on a curled part of the bottomed case to complete an electrolytic capacitor illustrated in FIG. 1. Then, an aging treatment may be performed while a rated voltage is applied.

In the exemplary embodiment described above, a wound electrolytic capacitor has been described. An application range of the present disclosure, however, is not limited to the wound electrolytic capacitor, and the present disclosure is also applicable to other electrolytic capacitors such as a chip electrolytic capacitor including a metal sintered body as an anode body, and a laminated electrolytic capacitor including a metal plate as an anode body.

Second Exemplary Embodiment

An electrolytic capacitor according to a second exemplary embodiment of the present disclosure is described. The electrolytic capacitor according to the second exemplary embodiment has a same configuration as the electrolytic capacitor according to the first exemplary embodiment except that the solute contains, as the first acid component, at least one of a composite compound of an organic acid and an inorganic acid, and a derivative of the composite compound. It is noted that the same contents as the first exemplary embodiment are not described.

In this present exemplary embodiment, the composite compound serving as the first acid component preferably includes at least one selected from the group consisting of borodisalicylic acid, borodiglycolic acid, and borodioxalic acid.

The concentration of the solute included in the electrolytic solution, i.e., the concentration of the total of the acid component including the first acid component, and the base component is set at more than or equal to 10% by mass and less than 40% by mass. The concentration of the solute ranges further preferably from 15% by mass to 35% by mass, inclusive, particularly preferably from 20% by mass to 35% by mass, inclusive. Since the composite compound used as the first acid component has a high degree of disassociation in the electrolytic solution, the first acid component easily reaches a vicinity of a defect of the anode body even when the concentration of the solute is more than or equal to 10% by mass. Thus, similarly to the first exemplary embodiment, the self-repairing performance of the oxide film can be improved. Further, since the composite compound has excellent heat resistance, pH of the electrolytic solution containing the composite compound can be easily retained. Hence, the dedoping of the dopant from the conductive polymer can be suppressed, and thus ESR of the electrolytic capacitor can be retained.

EXAMPLES

Hereinafter, the present disclosure is described in more detail with reference to examples. The present disclosure, however, is not to be limited to the examples.

Example 1

A wound electrolytic capacitor ((diameter) Φ 10 mm× (length) L 10 mm) with a rated voltage Vw of 25 volts and a rated electrostatic capacity of 33 μF was produced in the following manner.
(Preparation of Anode Body)
A 100-μm-thick aluminum foil was subjected to an etching treatment to roughen a surface of the aluminum foil. The roughened surface of the aluminum foil was subjected to an anodizing treatment to form an oxide film. The anodizing treatment was performed by immersing the aluminum foil in an ammonium adipate solution and applying a voltage of 40 volts to the aluminum foil. Thereafter, the aluminum foil was cut in a size of 6 mm×120 mm to prepare an anode body. The ratio V/Vw was set at 1.6. The oxide film had a thickness T of 55 nm.
(Preparation of Cathode Body)
A 50-μm-thick aluminum foil was subjected to an etching treatment to roughen a surface of the aluminum foil. Thereafter, the aluminum foil was cut in a size of 6 mm×120 mm to prepare a cathode body.
(Production of Wound Body)
An anode lead tab and a cathode lead tab were connected to the anode body and the cathode body, respectively, and the anode body and the cathode body were wound with a separator interposed between the anode body and the cathode body while the lead tabs were rolled in the anode body, the cathode body, and the separator. Ends of the lead tabs protruding from the wound body were connected to an anode lead wire and a cathode lead wire, respectively. The wound body obtained was anodized again to form an oxide film at a cutting end of the anode body. An end of an outer surface of the wound body was fixed with a fastening tape.
(Preparation of Polymer Dispersion)
A mixed solution was prepared by dissolving 3,4-ethylenedioxythiophene and polystyrenesulfonic acid (PSS, weight-average molecular weight of 100000) in ion-exchanged water. While the mixed solution was stirred, iron (III) sulfate (oxidant) was added to the mixed solution to cause a polymerization reaction. Thereafter, the reaction solution was dialyzed to remove unreacted monomers and the oxidant, so that a polymer dispersion was obtained that contained about 5% by mass of polyethylenedioxythiophene doped with PSS (PEDOT/PSS).
(Formation of Solid Electrolyte Layer)
The wound body was immersed in the polymer dispersion in a reduced-pressure atmosphere (40 kPa) for 5 minutes, and then the wound body was picked up from the polymer dispersion. Next, the wound body that had been impregnated with the polymer dispersion was dried in a drying furnace at 150° C. for 20 minutes to form a solid electrolyte covering at least a part of the oxide film.
(Impregnation with Electrolytic Solution)
As a solvent, γ-butyrolactone (γBL) and sulfolane were prepared. In this solvent, o-phthalic acid as the first acid component and triethylamine as the first base component were dissolved at a concentration of 19% by mass in total of the first acid component and the first base component. An equivalence ratio (initial equivalence ratio) of the first acid component to the first base component is was set to be 1. Polyethylene glycol (PEG) (weight-average molecular weight of 300) at a concentration of 10% by mass was dissolved in the solution obtained above. Lastly, 12% by mass of o-phthalic acid was added, and 3% by mass of pyrogallol was also added to prepare an electrolytic solution having a pH of 3.5. The capacitor element was immersed in the electrolytic solution in a reduced-pressure atmosphere (40 kPa) for 5 minutes. The concentration of each component is a concentration when a mass of the electrolytic solution obtained was defined as 100%. The concentration of the acid component was 28.2% by mass, and the concentration of the base component was 5.8% by mass.
(Sealing of Capacitor Element in Bottomed Case)
The capacitor element that had been impregnated with the electrolytic solution was sealed in a bottomed case to complete an electrolytic capacitor (A1) illustrated in FIG. 1. Thereafter, aging was performed at 95° C. for 90 minutes while applying the rated voltage Vw.
<Evaluation>
An electrostatic capacity and ESR of the electrolytic capacitor A1 were measured after the aging and after 2500 hours. Values of the electrostatic capacity and the ESR after 2500 hours were respectively divided by values of the electrostatic capacity and the ESR after the aging in order to calculate change rates. Table 1 shows results.

Examples 2 to 5

Electrolytic capacitors A2 to A5 were produced in the same manner as in Example 1 except that the concentration of PEG was changed as shown in Table 1. The electrolytic capacitors A2 to A5 were evaluated in the same manner. Table 1 shows results.

Comparative Example 1

An electrolytic capacitor B1 was produced in the same manner as in Example 1 except that the initial concentration of the solute was set at 10% by mass without changing the initial equivalence ratio of the first acid component to the first base component, the concentration of the additional o-phthalic acid was set at 4% by mass, and no pyrogallol was added (the concentration of the total solute was set at 14% by mass). The electrolytic capacitor B1 was evaluated in the same manner. Table 1 shows results. The concentration of the acid component was 10.9% by mass, and the concentration of the base component was 3.1% by mass.

Comparative Example 2

An electrolytic capacitor B2 was produced in the same manner as in Comparative Example 1 except that the formation voltage V was set at 45 volts to give a ratio V/Vw of 1.8. The electrolytic capacitor B2 was evaluated in the same manner. Table 1 shows results.

TABLE 1

| Electrolytic capacitor | V/Vw | Concentration of solute (% by mass) | | | | Concentration of PEG (% by mass) | pH | Change rate (%) | |
| | | Total of initially added components | Additional o-phthalic acid | Concentration of second acid component | | | | Electrostatic capacity | ESR |
| | | | | Pyromellitic acid | Pyrogallol | | | | |
|---|---|---|---|---|---|---|---|---|---|
| A1 | 1.6 | 19 | 12 | — | 3 | 10 | 3.5 | 6.0 | 1.4 |
| A2 | 1.6 | 19 | 12 | — | 3 | — | 3.5 | 4.9 | 1.3 |
| A3 | 1.6 | 19 | 12 | — | 3 | 1 | 3.5 | 5.0 | 1.4 |
| A4 | 1.6 | 19 | 12 | — | 3 | 5 | 3.5 | 5.3 | 1.4 |
| A5 | 1.6 | 19 | 12 | — | 3 | 15 | 3.5 | 6.2 | 1.4 |
| B1 | 1.6 | 10 | 4 | — | — | 10 | 4.3 | 37.0 | 18 |
| B2 | 1.8 | 10 | 4 | — | — | 10 | 4.3 | 5.2 | 1.4 |

Example 6

An electrolytic capacitor A6 was produced in the same manner as in Example 1 except that 4% by mass of pyromellitic acid and 5% by mass of pyrogallol were added in place of the additional o-phthalic acid (12% by mass) and the concentration of PEG was set at 15% by mass. The electrolytic capacitor A6 was evaluated in the same manner. Table 2 shows results.

Example 7

An electrolytic capacitor A7 was produced in the same manner as in Example 1 except that the initial concentration of the solute was set at 12% by mass without changing the initial equivalence ratio of the first acid component to the first base component, and 3% by mass of pyromellitic acid was added in place of pyrogallol. The electrolytic capacitor A7 was evaluated in the same manner. Table 2 shows results.

Example 8

An electrolytic capacitor A8 was produced in the same manner as in Example 1 except that the initial concentration of the solute was set at 10% by mass without changing the initial equivalence ratio of the first acid component to the first base component, and no pyrogallol was added. The electrolytic capacitor A8 was evaluated in the same manner. Table 2 shows results.

Example 9

An electrolytic capacitor A9 was produced in the same manner as in Example 1 except that the concentration of the additional o-phthalic acid was set at 6% by mass. The electrolytic capacitor A9 was evaluated in the same manner. Table 2 shows results.

Example 10

An electrolytic capacitor A10 was produced in the same manner as in Example 1 except that the initial concentration of the solute was set at 25% by mass without changing the initial equivalence ratio of the first acid component to the first base component, the concentration of the additional o-phthalic acid was set at 10% by mass, and the concentration of pyrogallol was set at 5% by mass. The electrolytic capacitor A10 was evaluated in the same manner. Table 2 shows results.

TABLE 2

| Electrolytic capacitor | V/Vw | Concentration of solute (% by mass) | | | | Concentration of PEG (% by mass) | pH | Change rate (%) | |
| | | Total of initially added components | Additional o-phthalic acid | Concentration of second acid component | | | | Electrostatic capacity | ESR |
| | | | | Pyromellitic acid | Pyrogallol | | | | |
|---|---|---|---|---|---|---|---|---|---|
| A6 | 1.6 | 19 | — | 4 | 5 | 15 | 3.7 | 6.3 | 1.4 |
| A7 | 1.6 | 12 | — | 3 | — | 10 | 4.5 | 8.0 | 1.6 |
| A8 | 1.6 | 10 | 12 | — | — | 10 | 3.7 | 6.5 | 1.5 |
| A9 | 1.6 | 19 | 6 | — | 3 | 10 | 4.0 | 6.0 | 1.5 |
| A10 | 1.6 | 25 | 10 | — | 5 | 10 | 3.0 | 5.0 | 1.4 |

Example 11

An electrolytic capacitor A11 was produced in the same manner as in Example 1 except that the formation voltage V was set at 35 volts to give a ratio V/Vw of 1.4 and no pyrogallol was added. The electrolytic capacitor A11 was evaluated in the same manner. Table 3 shows results.

Comparative Example 3

An electrolytic capacitor B3 was produced in the same manner as in Comparative Example 1 except that the formation voltage V was set at 35 volts to give a ratio V/Vw of 1.4. The electrolytic capacitor B3 was evaluated in the same manner. Table 3 shows results.

TABLE 3

| Electrolytic capacitor | V/Vw | Total of initially added components | Concentration of solute (% by mass) | | | Concentration of PEG (% by mass) | pH | Change rate (%) | |
|---|---|---|---|---|---|---|---|---|---|
| | | | Additional o-phthalic acid | Concentration of second acid component | | | | Electrostatic capacity | ESR |
| | | | | Pyromellitic acid | Pyrogallol | | | | |
| A11 | 1.4 | 19 | 12 | — | — | 10 | 3.7 | 50 | 33 |
| B3 | 1.4 | 10 | 4 | — | — | 10 | 4.3 | 200 | 300 |

Example 12

An electrolytic capacitor A12 was produced in the same manner as in Example 1 except that in place of triethylamine, an amidine, which is 1,2,3,4-tetramethylimidazolinium, was used as the first base component and the initial concentration of the solute was set at 14% by mass without changing the initial equivalence ratio of the first acid component to the first base component. The electrolytic capacitor A12 was evaluated in the same manner. The concentration of the acid component was 22.2% by mass, and the concentration of the base component was 6.8% by mass. Table 4 shows results.

Example 13

An electrolytic capacitor A13 was produced in the same manner as in Example 12 except that no PEG was added. The electrolytic capacitor A13 was evaluated in the same manner. Table 4 shows results.

TABLE 4

| Electrolytic capacitor | V/Vw | Total of initially added components | Concentration of solute (% by mass) | | | Concentration of PEG (% by mass) | pH | Change rate (%) | |
|---|---|---|---|---|---|---|---|---|---|
| | | | Additional o-phthalic acid | Concentration of second acid component | | | | Electrostatic capacity | ESR |
| | | | | Pyromellitic acid | Pyrogallol | | | | |
| A12 | 1.6 | 14 | 12 | — | 3 | 10 | 3.5 | 5.5 | 1.4 |
| A13 | 1.6 | 14 | 12 | — | 3 | — | 3.5 | 4.8 | 1.3 |

The present disclosure is applicable to a hybrid electrolytic capacitor including a solid electrolyte and an electrolytic solution.

What is claimed is:

1. An electrolytic capacitor comprising:
   a capacitor element; and
   an electrolytic solution, wherein:
   the capacitor element includes an anode body with an oxide film and a solid electrolyte in contact with the oxide film,
   the electrolytic solution contains a solvent and a solute,
   the solvent contains at least one selected from the group consisting of a lactone compound, a glycol compound, and a sulfone compound,
   the solute includes an acid component and a base component, the acid component including at least one of a polycarboxylic acid or a monocarboxylic acid, the base component including at least one of an amine or an amidine,
   a concentration of the solute in the electrolytic solution ranges from 15% by mass to 40% by mass, inclusive, and
   a ratio V/Vw of a formation voltage V of the oxide film to a rated voltage Vw of the electrolytic capacitor is more than 1.5 and less than or equal to 1.7.

2. The electrolytic capacitor according to claim 1, wherein the polycarboxylic acid includes an aliphatic polycarboxylic acid.

3. The electrolytic capacitor according to claim 2, wherein the aliphatic polycarboxylic acid includes at least one selected from the group consisting of oxalic acid, malonic acid, succinic acid, glutaric acid, adipic acid, pimelic acid, suberic acid, azelaic acid, sebacic acid, 1,6-decanedicarboxylic acid, 5,6-decanedicarboxylic acid, maleic acid, fumaric acid, and itaconic acid.

4. The electrolytic capacitor according to claim 1, wherein the monocarboxylic acid includes an aromatic monocarboxylic acid.

5. The electrolytic capacitor according to claim 1, wherein a pH of the electrolytic solution is less than or equal to 4.5.

6. The electrolytic capacitor according to claim 1, wherein:
   a conductivity of the electrolytic solution ranges from 0.01 mS/cm to 3 mS/cm, inclusive.

7. The electrolytic capacitor according to claim 1, wherein the rated voltage Vw is less than or equal to 100 volts.

8. The electrolytic capacitor according to claim 1, wherein a concentration of the base component in the electrolytic solution is more than or equal to 3.5% by mass.

9. The electrolytic capacitor according to claim 1, wherein a concentration of the acid component in the electrolytic solution is more than or equal to 3% by mass.

10. The electrolytic capacitor according to claim 1, wherein the lactone compound is γ-butyrolactone.

11. The electrolytic capacitor according to claim 1, wherein the glycol compound is ethylene glycol.

12. The electrolytic capacitor according to claim 1, wherein the sulfone compound is sulfolane.

13. The electrolytic capacitor according to claim 1, wherein the ratio V/Vw of the formation voltage V of the oxide film to the rated voltage Vw of the electrolytic capacitor is more than or equal to 1.6 and less than or equal to 1.7.

* * * * *